United States Patent [19]

Brown et al.

[11] Patent Number: 5,537,290

[45] Date of Patent: * Jul. 16, 1996

[54] WORK STATION WITH ADJUSTABLE FLAT ELECTRONIC DISPLAY SCREEN

[75] Inventors: Mortimer Brown, Oakville; Jonathan Crinion, Toronto, both of Canada

[73] Assignee: Teknion Furniture Systems (A partnership of Teknion Holdings Inc. and Birchgrove Investments Inc., Downsview, Canada

[*] Notice: The portion of the term of this patent subsequent to Jun. 5, 2012, has been disclaimed.

[21] Appl. No.: 261,055

[22] Filed: Jun. 13, 1994

Related U.S. Application Data

[63] Continuation-in-part of Ser. No. 894,613, Jun. 5, 1992, Pat. No. 5,321,579, which is a continuation-in-part of Ser. No. 733,166, Jul. 19, 1991, abandoned.

[51] Int. Cl.⁶ .............................. G06F 1/16; H05K 7/16
[52] U.S. Cl. .................. 361/681; 248/492.2; 248/458; 52/36.4
[58] Field of Search ................ 174/48; 248/447, 248/458, 442.2, 283.1, 223.41, 225.11, 230.1, 125.1, 917–923; 312/223.1, 223.3, 223.6, 7.2; 52/36.1, 36.4, 36.5, 239; 364/708.1; 361/681, 682, 825

[56] References Cited

U.S. PATENT DOCUMENTS

| | | | |
|---|---|---|---|
| 4,535,577 | 8/1985 | Tenser et al. | 174/48 |
| 4,685,255 | 8/1987 | Kelley | 52/36.1 |
| 4,884,306 | 12/1989 | Goetz | 248/225.31 X |
| 5,108,063 | 4/1992 | Koerber, Sr. et al. | 248/920 X |
| 5,129,200 | 7/1992 | Kaneko | 52/36.1 X |
| 5,321,579 | 6/1994 | Brown et al. | 361/681 |

Primary Examiner—Michael W. Phillips

[57] ABSTRACT

The present invention is directed to office panelling systems having a flat electronic display screen is supported to one side of an office panel, with the display screen visible to one side of the panel. An adjustable securing arm supports the display screen and is releasably attached to horizontal rails of the office panel. With this arrangement, the securing arm and display screen can be positioned at different angles and spacings from the office panel, utilizes space more effectively, and allows more efficient use of the work station for other tasks. In a preferred embodiment, the display screen can be released from the securing arm and separately supported on the work surface.

12 Claims, 11 Drawing Sheets

WORK STATION WITH ADJUSTABLE FLAT ELECTRONIC DISPLAY SCREEN

CROSS-REFERENCE TO RELATED APPLICATIONS

This application is a continuation-in-part of application Ser. No. 07/894,613 filed Jun. 5, 1992, now U.S. Pat. No. 5,321,579, which is a continuation-in-part of application Ser. No. 73/733,166, filed Jul. 19, 1991, now abandoned.

FIELD OF THE INVENTION

The present invention relates to office panelling systems and, in particular, to office panelling systems having associated electronic display screens.

BACKGROUND OF THE INVENTION

Office panelling systems for subdividing of office space have become extremely popular due to their ability to rearrange the office space by reconfiguring the panels as required at different points in time. These free-standing office panels can have a host of accessories used to effectively define a work station or work area that is efficient and convenient to use by the operator. As can be appreciated, efficient office layout has become important when one considers the cost of rental space. Furthermore, the work station should fit the needs of the user to ensure high productivity in a safe environment.

Both the professional staff and the support staff in office environments now generally use, or have access to, personal computers or word processing stations, each of which has its own computer terminal. These terminals are typically cathode ray tubes and although the monitors may be fairly small, they still take up a considerable amount of the work space primarily due to the depth of the cathode ray tube. A number of arrangements have been proposed for supporting of these terminals above the work surface or to more effectively use the work surface about the display screen, but there is still a considerable amount of work surface occupied by the terminal itself.

Most office panelling systems have provided convenient access of power within the individual panelling system and one such system is shown in our U.S. Pat. No. 4,535,577. Each of the major office panelling systems have a host of accessories to allow effective use of the defined work environment.

There remains a need to provide a more efficient system which has more usable work space without increasing the size of the work station.

SUMMARY OF THE INVENTION

In an office panelling system having a multiplicity of discrete office panels interconnected to subdivide an open area in a particular manner and an associated work surface immediately in front of one of said panels, according to the present invention, the panel and associated work surface cooperate to define a work station. The work station includes a display monitor and a keyboard. The display monitor is supported in a cantilevered manner by an adjustable securing arm attached adjacent the panel above the work surface. The securing arm and the screen cooperate to position the screen at any of a host of positions between a position adjacent the panel to a forward position spaced from front of the panel and above said work surface. With this arrangement, an operator may freely adjust the position of the screen for a particular operator preference and may return the screen to a storage position which does not interfere with the work surface to allow additional work surface utilization for other tasks.

In an office panelling system, according to the present invention, the system has a number of interconnected, free-standing panels with these panels generally being about five inches thick. The panelling system is equipped with a flat electronic display screen having a display surface which is supported in a cantilevered manner by one of the panels. This display surface is visible to one side of the panel. The display screen can cooperate with other computer components associated with the panelling system, such as keyboard supported on the work surface. In this way, the display screen cooperates with the panel and the need for a separate standalone CRT supported on an associated work surface associated with the panel is avoided.

According to an aspect of the invention, the flat electronic display screen is a liquid crystal display screen.

According to a further aspect of the invention, the panelling system has an associated work surface immediately adjacent the panel with the display screen with a data entry device connected to the electronic display screen with the data entry device supported on the work surface. In this way, the work station has the data entry device, such as a keyboard, supported on the work surface with the remaining portion of the work surface being available for other purposes and the electronic display screen being an inherent part of, or supported from, the associated panel in a manner to allow effective use of the work surface for non-computer tasks.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
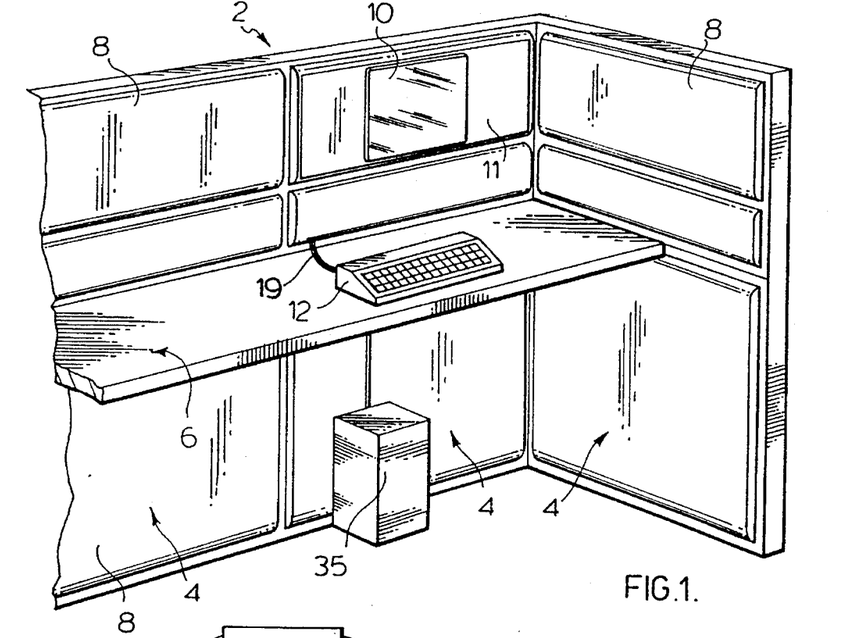
FIG. 1 is a partial perspective view of an office panelling system having a flat electronic display screen secured in one of the panels.

The office panelling system, generally shown as 2, has a number of interconnected free-standing individual panels 4. As shown in FIG. 1, a work surface 6 is associated with the free-standing panels 4. The free-standing panels have removable covers generally shown as 8. The overall thickness of the panels is less than 5 inches and normally is about 3½ inches thick.

One of the individual panels has had the normal cover removed and has a flat electronic display screen received in a specialized cover 11. The flat electronic display screen 10 could be a liquid crystal display, a gas plasma display screen or any other suitable flat, thin profile screen. Thin profile display screens are typically less than about 1 inch in depth. The specialized cover 11 is inserted in the office panelling system above the work surface preferably in a vertical surface. A data entry station generally shown as 12 is associated with the flat electronic display screen 10 and is electrically connected thereto by means of electrical cables 13. The data entry station 12, in this case a keyboard, is supported on the work surface 6 and allows data to be entered or programs adjusted with the results being shown on the flat electronic display screen 10. Thus, the flat electronic display screen 10 and the keyboard 12 form a work station suitable for Word processing or other programming typical of a personal computer or an existing computer station. As can be appreciated, the normal cathode ray tube associated with a personal computer has now been replaced with the flat electronic display screen 10 which has been made an integral element of the office panelling system. As shown in the sectional view of FIG. 2, a portion of the electronic display screen 10 is enclosed within the panel, with this enclosed portion generally being designated 14. Thus, the interior of the office panel 4 is effectively used to house a portion of the flat electronic display screen 10 with the actual display surface of the display screen 10 exposed to one side of the office panelling system.

Figure 2:
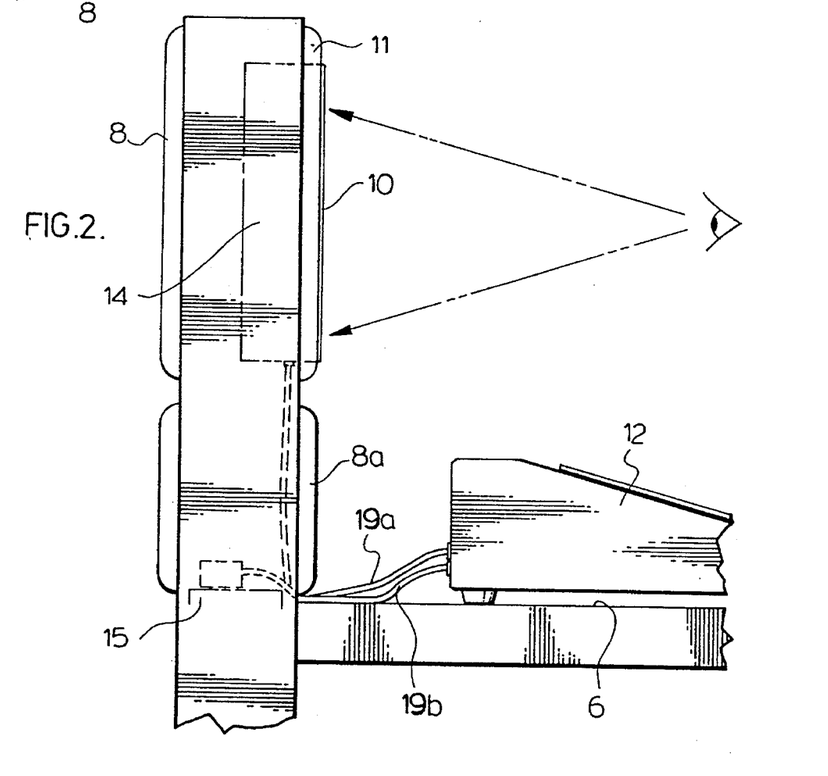
FIG. 2 is a partial side elevation showing the display screen and an associated data entry station.

The keyboard 12, as shown in FIG. 2, has cable 13a and 13b at the rear thereof which are connected to other elements in the cavity of the panel 4. Cover 8a is hinged at the top surface thereof to allow convenient access of the cables to the interior of the panel. Cable 13a is connected to the display screen 10 with cable 13b connected to a power outlet 15 connected to a power conduit therebelow.

Figure 3:
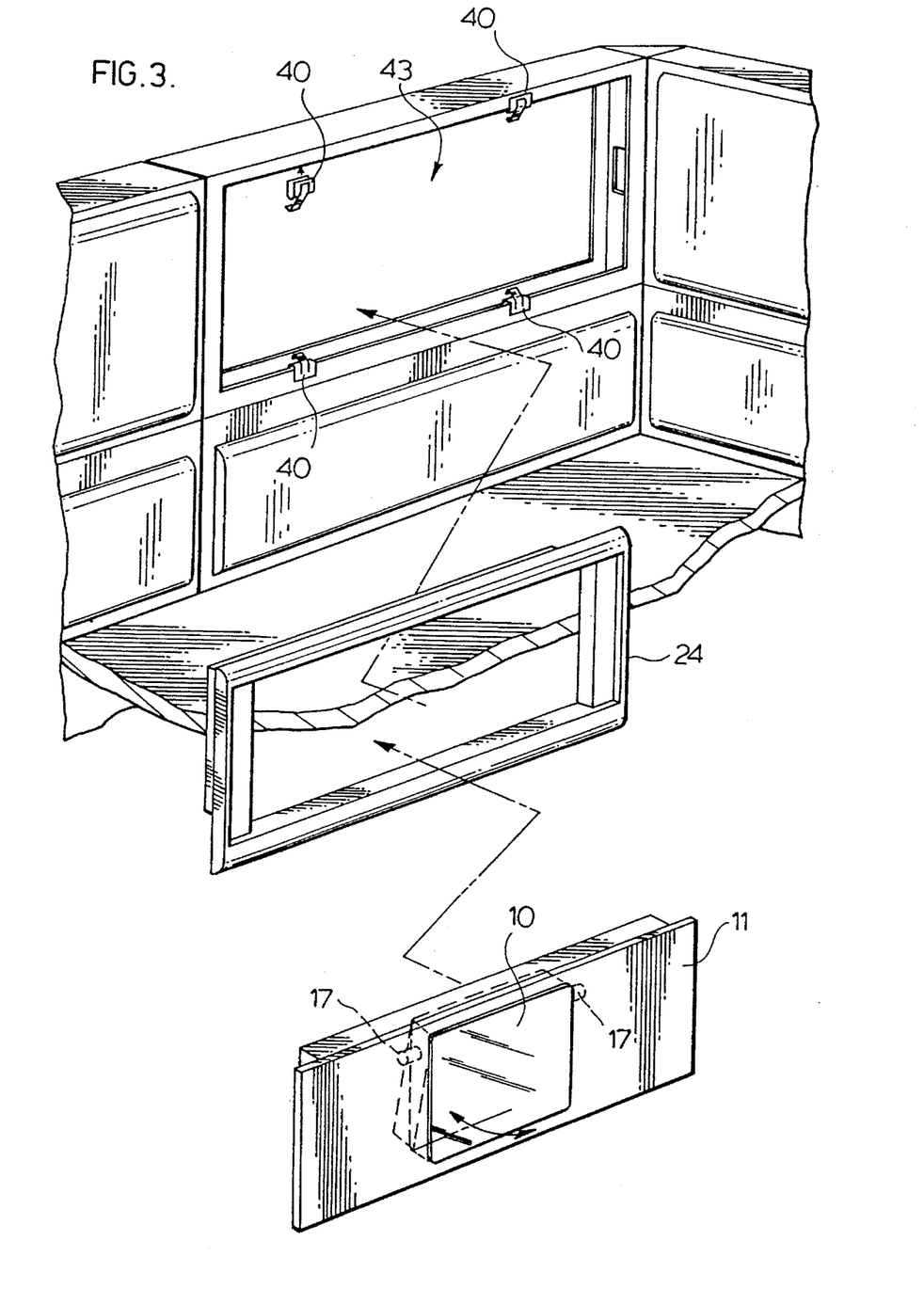
FIG. 3 is an exploded perspective view showing the mounting of an electronic display screen.

One particular method of mounting of the flat electronic display screen 10 is shown in FIG. 3. In this case, the flat electronic display screen 10 is mounted in a customized peripheral frame arrangement 24 which is designed to snuggly engage and protect the customized cover 11 including the display screen 10. This frame 24 is then secured within the office panelling system by removing of an existing cover and inserting of the frame 24, the customized cover 11 and display screen 10 in the panel as generally indicated in FIG. 3. Once so inserted, the electronic display screen 10 forms part of the office panelling system by forming an outer vertical planar section of the panel and also defines a viewing screen of a work station.

By incorporating the electronic display screen 10 into the office panelling system 2, significant space on the work surface 6 is available for other purposes, or in the case of a dedicated terminal, the depth of the work surface could be reduced. Securement of the electronic display screen 10 in the customized cover 11 accommodates angular adjustment of the flat electronic display screen 10, by limited pivotting action of the display screen 10 about the pivot mounts 17 securing the display screen within the customized cover 11. In this way, slight angular adjustment of the display screen 10 can be accomplished to eliminate such problems as glare from overhead lights or adjustment for differing heights of users. The portion of the specialized cover 11 either side of the display screen 10 can be covered in a material or finish corresponding to the other covers 8 or can be designed to complement the other covers 8.

Figure 4:
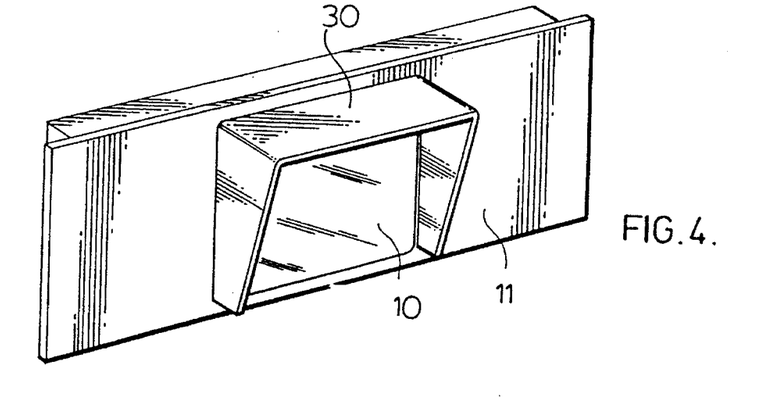
FIG. 4 is a perspective view of one panel having a shield thereabout.
Figure 5:
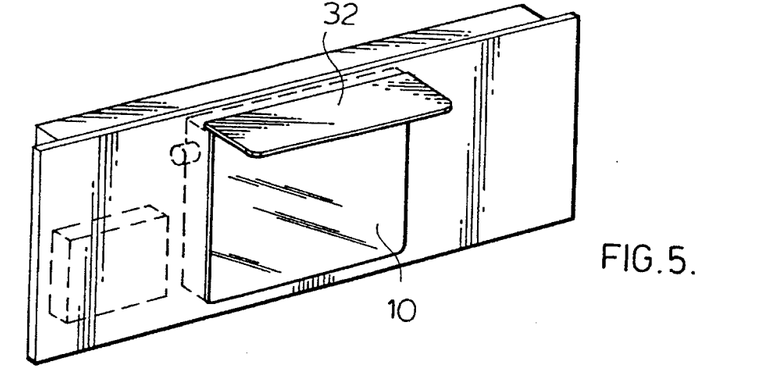
FIG. 5 is a perspective view of one panel having a pivotting screen mounted therein.

Other arrangements for reducing glare are shown in FIGS. 4 and 5. In FIG. 4, a hood 30 is provided about the display screen 10. In FIG. 5, a cap 32 projects outwardly from above the display screen to partially shade the display screen 10. In these cases the hood 30 or cap 32 can be added to the customized cover 11 or made an integral part thereof.

Figure 6:
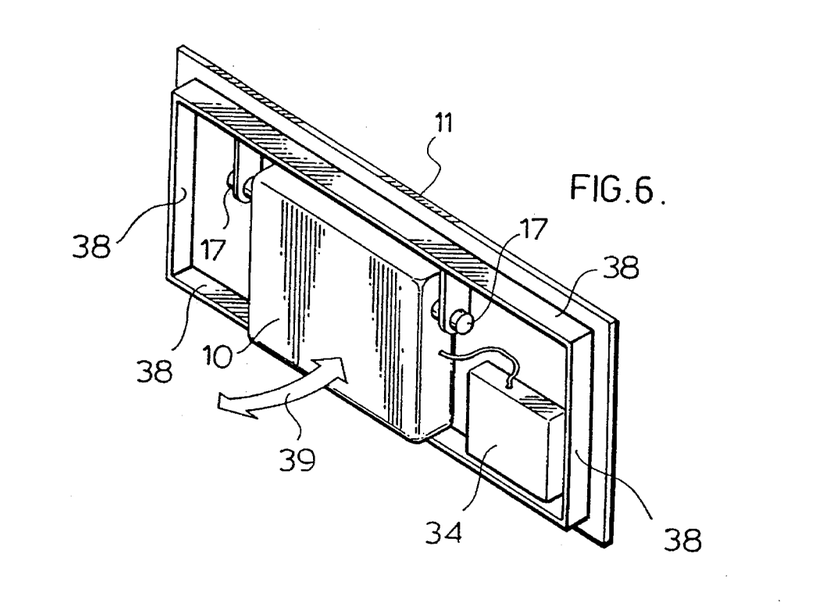
FIG. 6 is a rear perspective view of the screen of FIG. 5.

A review of FIGS. 4 through 6 illustrates that typically the display screen 10 is of a width and height less than the cover which is replaced. As shown in FIG. 6 this additional space can accommodate associated electronics 34 of the display screen 10. Any one specialized cover 11 could also receive two or more flat electronic display screens 10, or display screens could be located to opposite sides of the panel.

The office panelling system 2 can include interior power conduits, as generally shown in FIG. 2 and as shown in our U.S. Pat. No. 4,535,577, whereby the power for the flat electronic display screen 10 and the data entry station 12 can be provided interior to the panelling system.

The specialized cover 11 shown in FIG. 6 has rearwardly projecting frame members 38 which are sized to snuggly engage the peripheral frame 24 shown in FIG. 3. These frame members also serve to support the pivotting mounts 17 allowing angulation of the screen as indicated by arrow 30. It is also possible to merely have spring clips 40, shown in FIG. 3, engaging the interior frame components of a panel, directly engage the customized cover 11 thereby eliminating the peripheral frame 24.

One particular arrangement for adjustably mounting of the electronic display screen has been described although other mounting arrangements can be used. For example the electronic display screen 10 could have a universal support within the customized cover 11 to allow angulation in all directions.

It can be appreciated from the above disclosure that an improved computerized work station is defined wherein the display screen of the computerized work station is incorporated in and forms part of an office panelling system. This arrangement takes advantage of the space within the panel and the power availability of the panel to suitably house a particular type of electronic display screen as well as satisfying the necessary screening function of the panelling system. Furthermore increased work space results due to variable association of the display screen relative to the panel. In the preferred form, the display screen is incorporated into the panel whereby more efficient use of the work space or a reduction in the size of the work space can be achieved. If desired, the depth of the work space may be reduced by up to about 12 inches.

FIGS. 7 through 10 illustrate a different embodiment where the flat display screen 50 is secured to a horizontal member 42 of the frame of an office panel. The various other structural elements of the frame are not shown, but are covered or essentially covered by the office cover elements 40. The rail 42 of the office panel frame is preferably accessible between vertically stacked panels to allow securement of the system without removal of the individual office cover elements 40.

Figure 7:
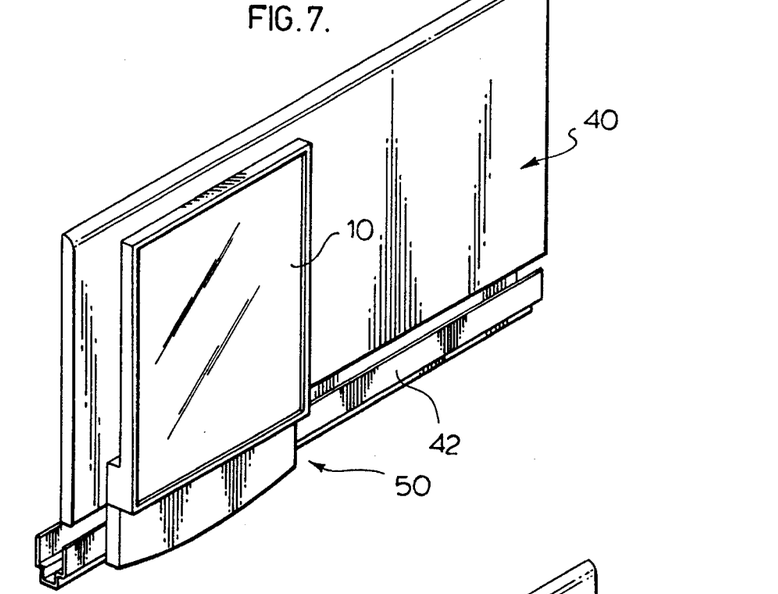
FIGS. 7 and 8 are partial perspective views of an alternate mounting arrangement.
Figure 8:
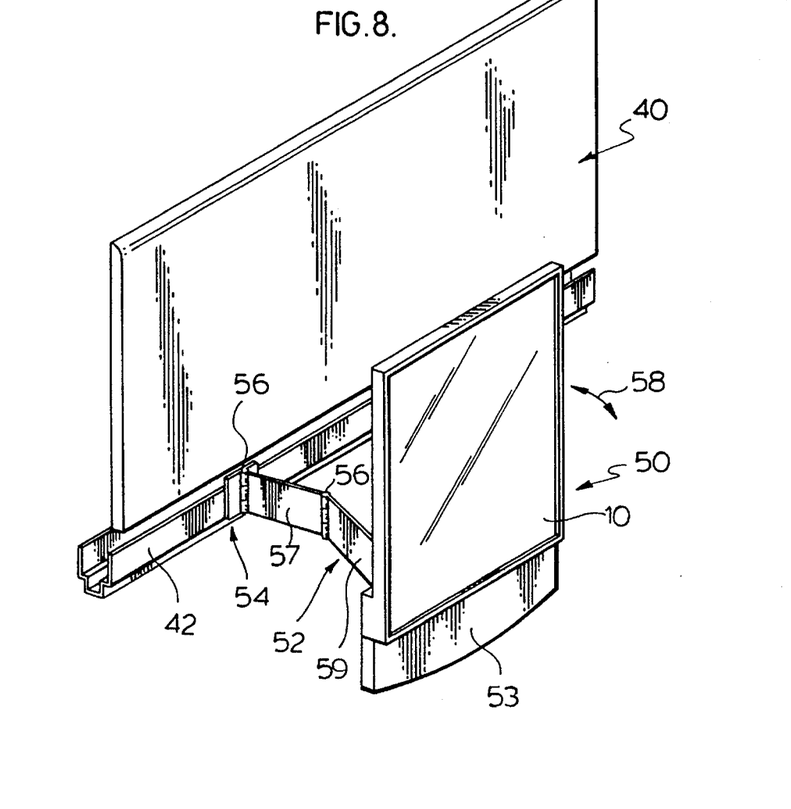

In FIGS. 7 and 8, the flat display screen 50 is movable from a storage position, as shown in FIG. 7 immediately adjacent the front of the office cover element 40, to an extended position, shown in FIG. 8. The movement between the storage position and the extended or forward position of FIG. 8 is accomplished by pulling on the flat display screen and thereby extending the adjustable support arm 52 which is of a bifold design. This adjustable support arm 52 is hingedly attached at 56 adjacent the rail 42 of the office panel frame and is hingedly secured intermediate its length at another hinge point 56 and is also hingedly secured immediately adjacent the flat screen to accommodate the bifold movement. In this way, the screen can stay aligned with its storage position as it is extended or can be moved to various positions possible due to the bifolded arm arrangement.

It is also possible to secure the adjustable arm to an accessory element secured to the panel frame. The accessory element may have a multiplicity of horizontal securing rails which the panel end of the adjustable arm can engage for positive securement to the panel frame. Any securement arrangement must be positive and capable of supporting the flat screen and arm at all positions. The extended position of the arm results in substantial load due partially to the cantilever support. It is also possible to have a separate element designed specifically to support the adjustable arm. Such an element could be a pass through element having a horizontal track for engaging one end and thereby supporting the adjustable arm.

As shown by arrows 58, the display screen 50 is also adjustable to accommodate a rearward tilting of the display screen 50 about hinge 59. This may be desirable to accommodate operators of different heights, in that the flat display screen is most easily recognized when the line of sight is generally perpendicular to the plane of the screen. This vertical adjustment can occur between the base 53 of the adjustable support arm 52 and the flat display screen 50 mounted thereabove. A simple limited hinge arrangement works satisfactorily. Preferably, this is a stiff hinge arrangement, such that when the screen is angled, it stays in position.

Figure 9:
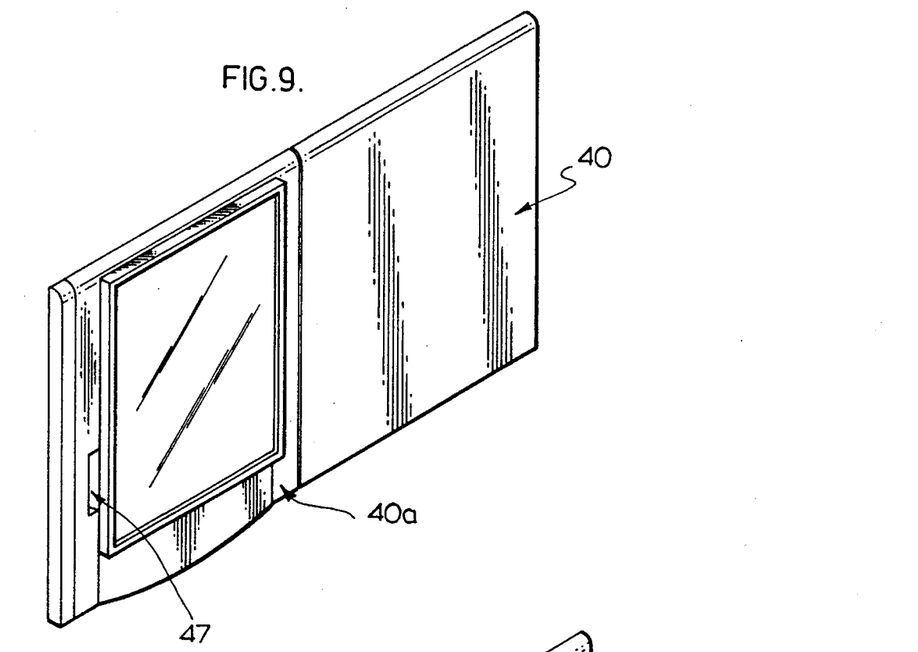
FIGS. 9 and 10 are partial perspective views of an alternate embodiment.
Figure 10:
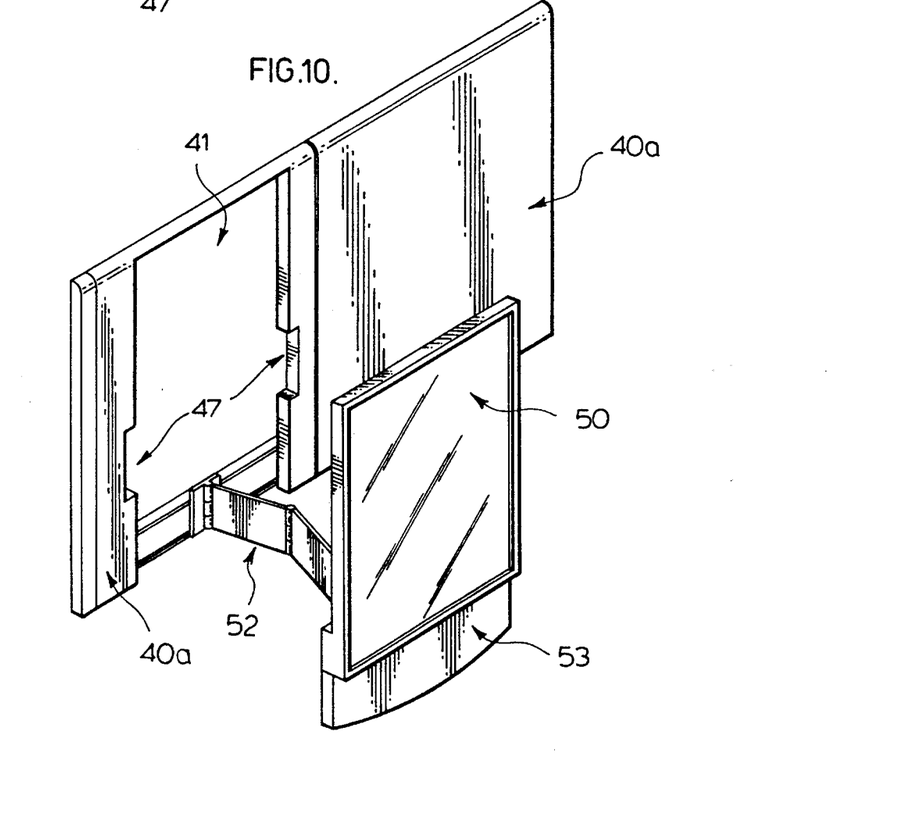
Figure 11:
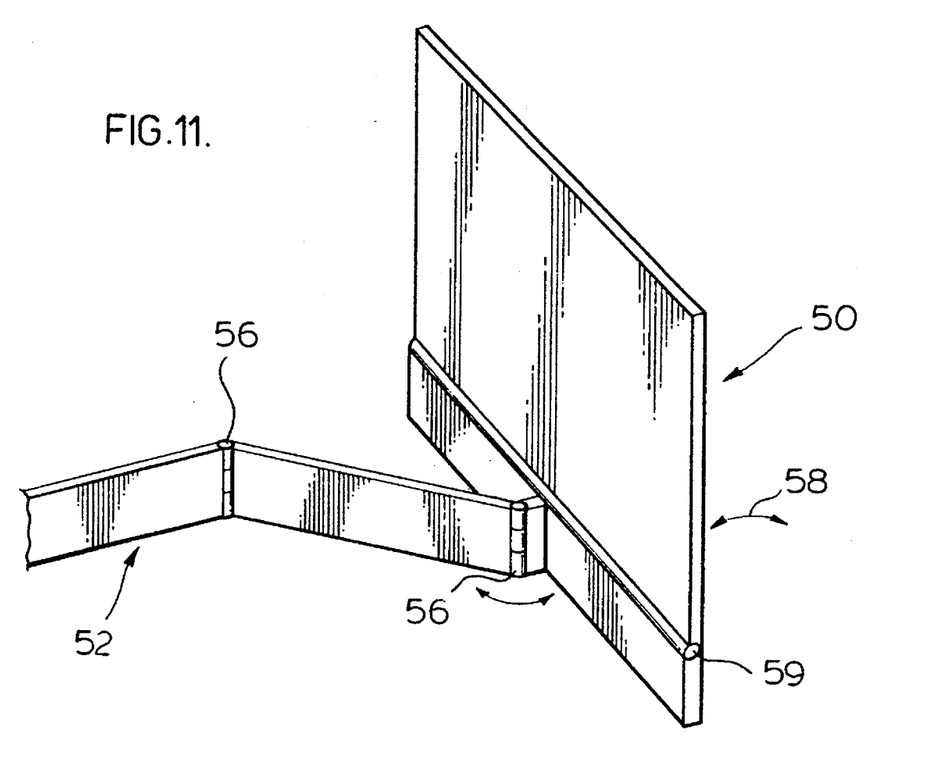
FIG. 11 is a partial perspective rear view of the securing arm and display screen.

The same features are incorporated in the embodiment of FIGS. 9 and 10, however, in this case, a modified office panel element 40a is used which has a recess 41 therein for partially accommodating the depth of the flat display screen 50, the adjustable arm 52 and the base 53. In order to simplify movement of the flat display screen 50 from the storage position of FIG. 9 to an extended position, such as shown in FIG. 10, the recess 41 includes a notched-out area 47 in the recess 41 to allow access to the edge of the display screen 50 when placed in the storage position as shown in FIG. 9. In this way, the flat screen is partially accommodated within the office panel.

The flat display screen 50 requires an electrical connection with electronic processing apparatus which can be housed within the panel and this electrical connection can be flat ribbon type connection which moves in response to movement of the arm 52. In fact, the ribbon connection can be directly secured to or contained within the adjustable arm. This ribbon connection also accommodates electrical connection with the keyboard supported on a work surface in front of the panel having this movable display screen.

The adjustable arm is shown as comprising flat structural segments interconnected by hinges. The arm segments can be tubular with an open central passage for accommodating the ribbon connection, with the ribbon connection leaving the arm adjacent the flat screen and at the panel.

The adjustable arm 52 supports the flat display screen 50 in a cantilevered manner above a work surface and allows the user to adjust the forward position of the display screen to suit their particular needs. The method of mounting the adjustable arm 52 to the rail 42 of the frame of an office panel allows slide adjustment of the arm along the length of the support rail to a desired position which can subsequently be maintained. This provides the user with further flexibility in laying out his work space or to accommodate any changes in his environment. When the user is no longer using the computer, the flat display screen 50 may be moved to the storage position, thus freeing additional work space for other tasks. Even in the storage position, the user may make quick reference to the computer, as the screen would still be available. It is only for prolonged use that the user may find it more preferable to adjust the position of the screen for his particular convenience. The horizontal adjustability of the arm 52 on the rail 42 is beneficial with the arrangements of FIGS. 7 and 8, whereas in FIGS. 9 and 10, a particular mounting position is required in order that the screen be properly received within recess 41.

The extent to which the thin profile display monitor is movable forward of the screen is a function of the length of the arms. Typically, a forward position 12 to 18 inches in front of the panel is sufficient, however, this limitation can change according to the particular application.

An alternate embodiment of the invention is shown in FIGS. 12 through 18 and a new numbering scheme is used with these figures.

Figure 12:
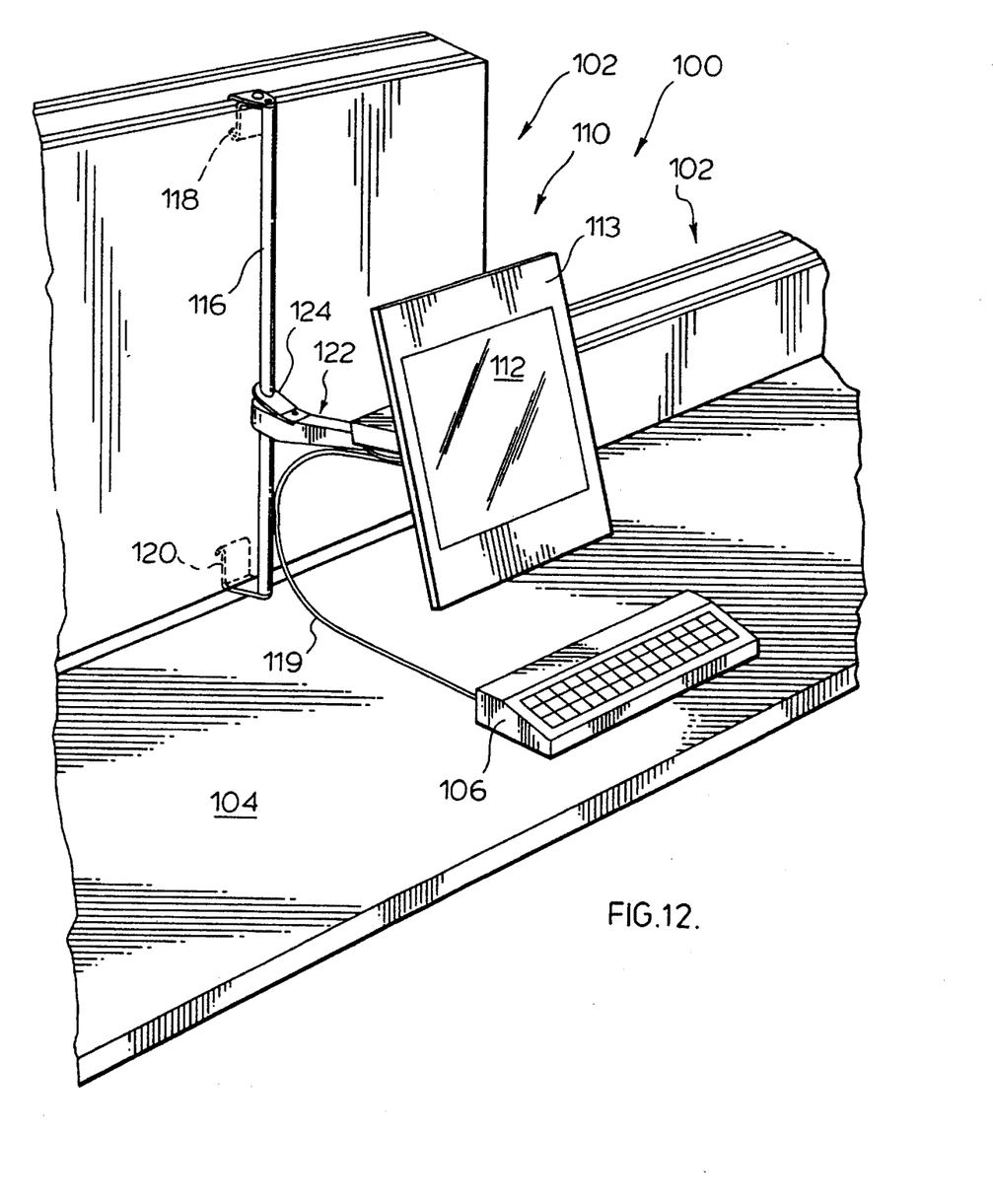
FIG. 12 is a partial perspective view of an office panel with a monitor adjustably supported thereby.

FIG. 12 shows an office panelling system 100 having a number of interconnected office panels 102 and an associated work surface 104 adjacent one side of the office panels. An adjustable monitor arrangement 110 has a flat display screen 112 mounted for adjustable movement and positioning in front of, and cantilevered from, one of the office panels 102. The display screen includes a frame member 113 thereabout. The flat display screen 112 is pivotally connected to a cantilevered securing arm 122, which is in engagement with the vertical rod 116 secured to one side of the office panel 102. The vertical rod is secured to the office panel by means of a top securement bracket 118 and a bottom securement bracket 120. These securement brackets typically engage the metal frame of the office panel and the office panels include releasable cover elements to provide an exterior finish to the office panel. The cantilevered securing arm 122 includes at the end thereof, remote the flat display screen, a bearing port 123 which is sized for sliding movement along the vertical rod 116. The cantilevered securing arm 122 is held in a particular vertical position on the vertical rod 116 by means of a spring lock 124, which, in the position shown in FIG. 12, is in vertical locking engagement with the vertical rod 116. In order to allow adjustment in the vertical position of the securing arm on the vertical rod, the spring lock 124 is forced downwardly relative to the securing arm 122, thereby releasing the arm for sliding movement along the vertical rod. The arm is still free to pivot on the vertical rod 116.

The work surface supports the keypad 106, which acts as an input device for the electronic display screen 112 and is electrically connected thereto by a flexible electrical cable 119.

Figure 13:
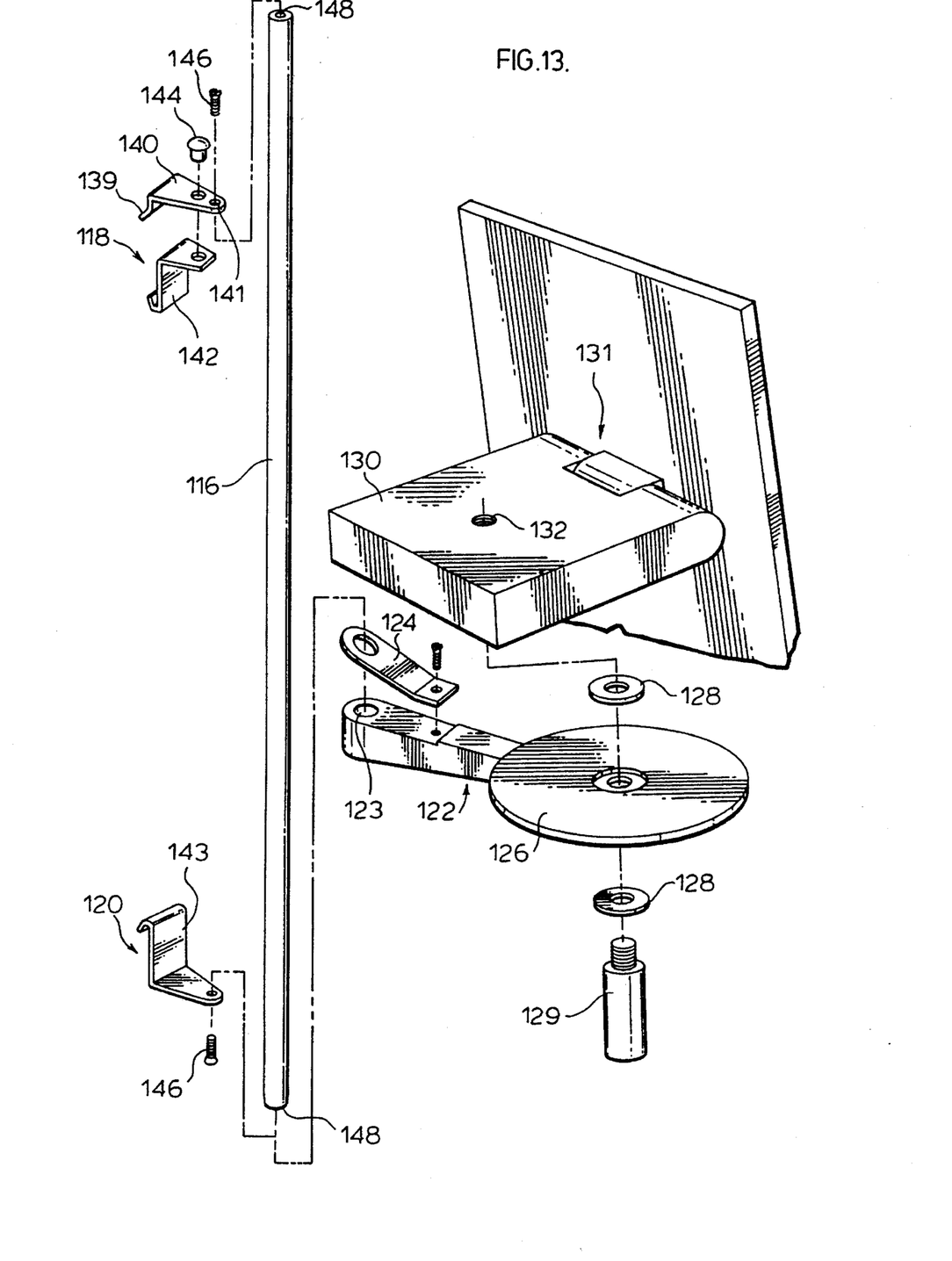
FIG. 13 is an exploded perspective view illustrating details of the mounting arrangement.

The flat display screen 112, as shown in FIG. 13, has at the rear surface thereof an adjustable mount member 130, which accommodates tilting of the display screen about a horizontal axis. The mount member includes thread port 132 for receiving the threaded portion of bolt 146, which forms the mechanical attachment of the display screen to the securing arm. It can be seen adjustable mount member 130 is pivotally secured at 131 to the rear surface of the flat display screen. This connection also allows, or has associated therewith, electrical connections between the flat display screen 112 and adjustable mount member 130, which can include certain electronic circuits for controlling of the display screen and interfacing with the keyboard. For simplicity, the electrical connections have not been shown, but it can be appreciated that there are flexible connectors associated with these members which will attach to computer components associated with the office panelling system. These connectors can be enclosed or merely in addition to the mechanical securement of the display screen.

The cantilevered securing arm 122 includes a circular support plate 126 which engages the bottom surface of the adjustable mount member 130. Bolt member 129 passes through first washer 128 and through a port in the mounting plate 126, through a second washer 128 and into the threaded port 132 of the adjustable mount member. In this way, the display screen 112 is attached to the securing arm, but can accommodate limited pivotting movement about the axis of bolt 129.

The mounting brackets 118 and 120 are but one arrangement for securing of the vertical member 116 in front of the panel 102. It can be seen that the top member includes an "L" shaped bracket 140 with a cam surface 139 for a snap type fit with a slot in the frame of the panel and member 142 serves as a capture member for engaging a further part of the frame. These components can be held together by a rivet or holding pin 144. The vertical rod 116 is attached to member 140 by means of threaded bolt 146, which engages the threaded port 148 of the vertical rail. A bottom capture member 143 is secured to a lower horizontal rail of the frame. These are merely examples of how the vertical rod 116 can be secured and other securing methods can be used. For example, the top member can include a hook arrangement, which is brought into engagement with a horizontal rail. The bottom bracket can have a cam and latch arrangement which locks with the lower rail.

Figure 14:
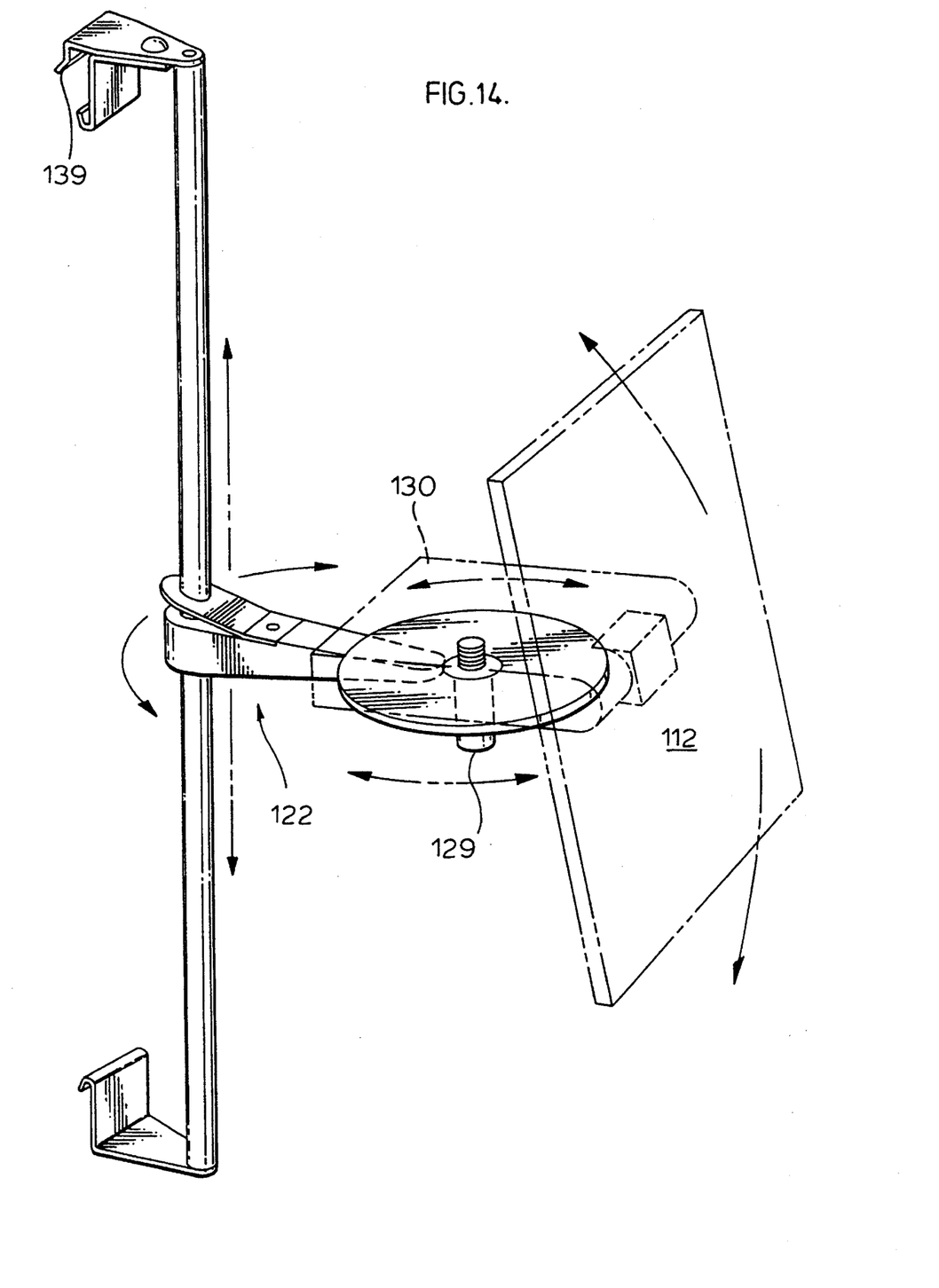
FIG. 14 is an assembled perspective view of the mounting arrangement.

It can be seen in FIG. 14 that the flat display screen 112 can be pivotted relative to the mounting member 130, as desired, and can be rotated around the shaft of the bolt 129. The securing arm 122 may also be pivotted about the vertical rod 116 and can be adjusted vertically on the rod 116. This arrangement allows variable height, variable angle, and different spacings of the flat display screen from the office panel. It can be appreciated that the arm 122 may be forced in one direction and the screen can assume a position in close proximity to the panel face (i.e. generally in a storage position). In addition, the screen can be raised to a vertical clear position well above the work surface, where there is little or no interference with other tasks being carried out. The user can then position the securing arm as desired to effect an "in use" position.

Figure 15:
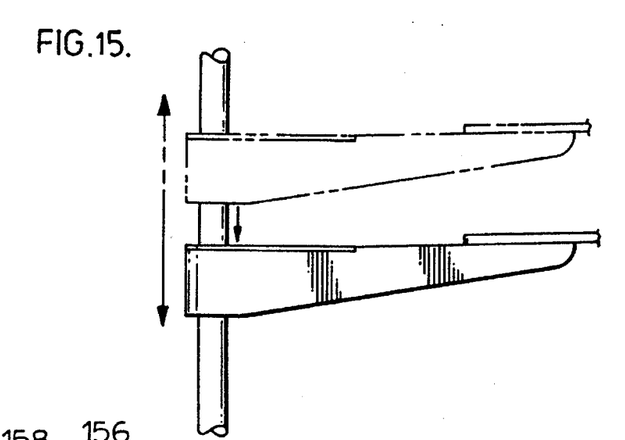
FIG. 15 illustrates vertical adjustment of the monitor.
Figure 16:
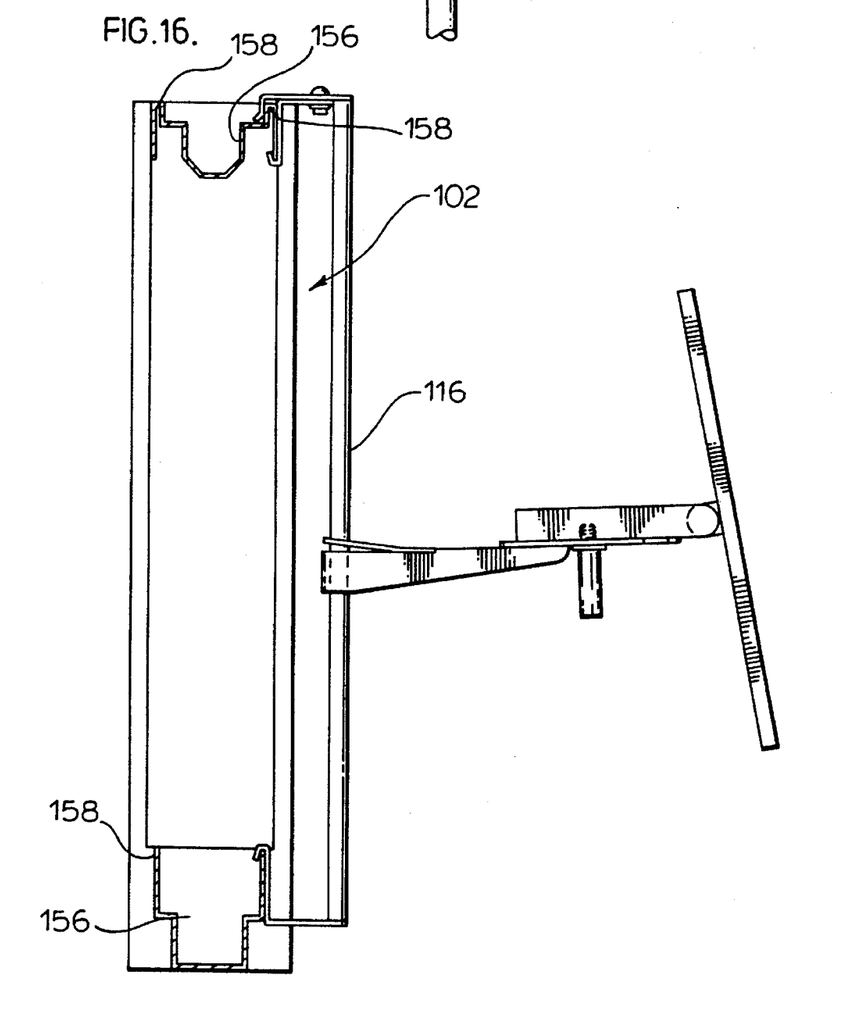
FIG. 16 illustrates securement of the monitor to an office panel frame.

FIGS. 15 and 16 show the vertical adjustment of the securing arm 122. The spring lock 124 is moved downwardly towards the securing arm, and thus, releases from the vertical rail 116. FIG. 16 shows the locked position of the spring lock 124, where it can be seen in engagement with the vertical rail. The angle of the spring arm is such to cause the port in the spring arm, through which the rail passes, to be engaged in the locked position and to not engage the rail in the release position.

FIG. 16 also shows how the frame of the office panel includes horizontal rail member 156, which are upwardly opening "U" shaped members and have opposed upper retaining surfaces 158 which are engaged by the securing brackets 118 and 120. This provides positive securement of the vertical rod 116 to the frame of the office panel. As each of these members are horizontal rail members, the brackets may slide there along, and thus, can be positioned at any of a number of positions in the length of the horizontal rail members, which are essentially the length of the office panel.

Figure 17:
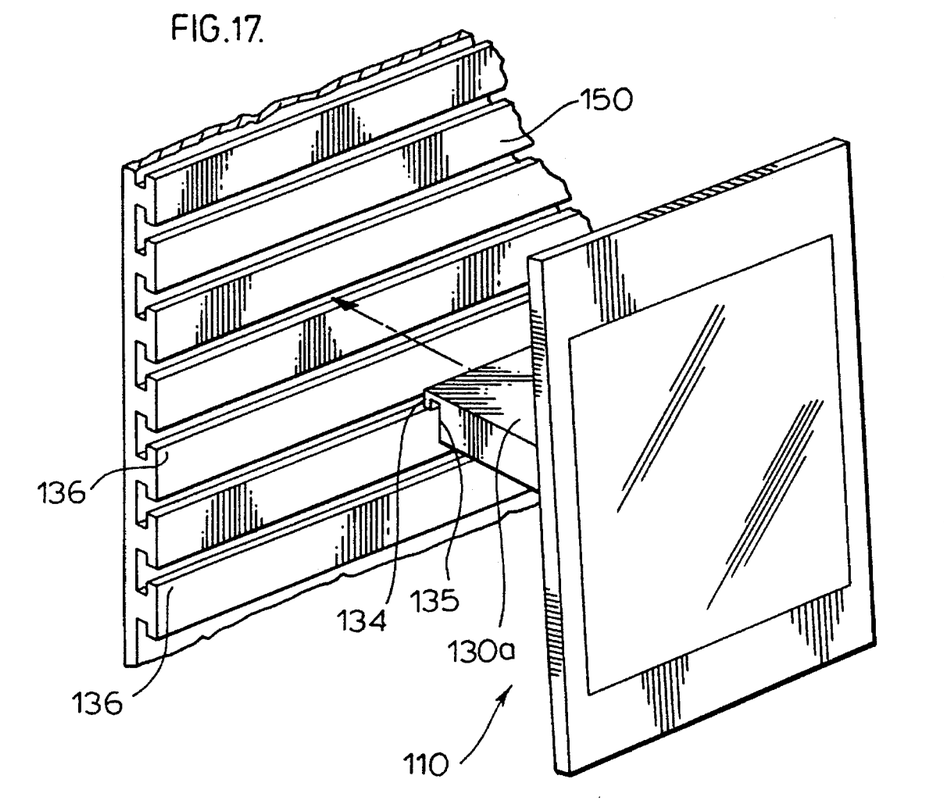
FIGS. 17 and 18 illustrate securement of the monitor to a releasable rail element attachable to the office panel frame.
Figure 18:
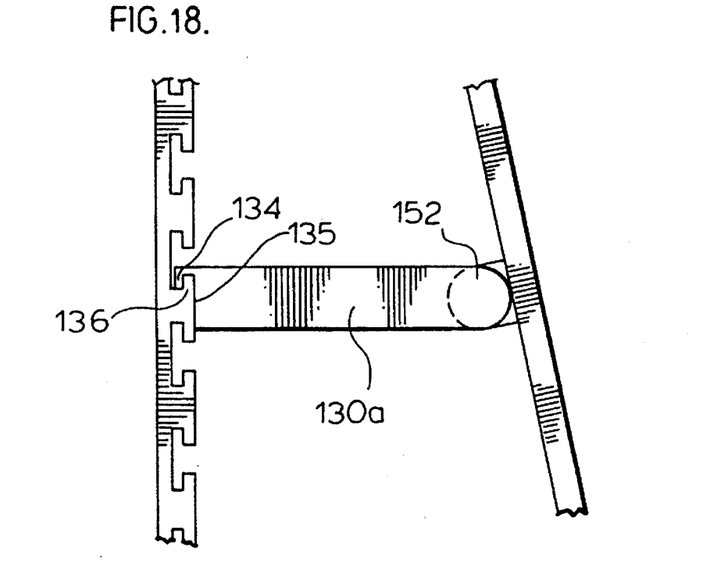

A further embodiment of the invention is shown in FIGS. 17 and 18. In this case, the adjustable monitor arrangement 110 has a different adjustable mounting member 130*a*, which has a hook shape 134 for engaging a rail 136 of a releasable rail element 150. This releasable rail element directly engages the frame of the office panel and forms an exterior surface of the office panel. The releasable rail element has a host of rails 136 which can allow securement of the adjustable monitor arrangement as well as securement of other components, such as paper trays, filing bins, etc. This type of rail element is well known. Associated with the mounting member 130*a* is a flat, vertical bearing face 135 which engages the outer surface of the rail member. This is clearly shown in the sectional view of FIG. 18. It can also be appreciated that the mounting member 130*a* can have a universal type connection to the flat display screen to allow greater adjustment of the angle of the screen. It can be appreciated that the flat display screen, as shown in FIGS. 12 through 19, can be supported from an office panel in a cantilevered manner and the position of the screen is adjustable over the length of the office panel or the length of the rail element. The flat electronic display screen 112 and its associated mounting member 130 can also be supported at various angles on a work surface. For example, the display screen and mounting member 130 are released from the securing arm and the screen supported at different angles on the work surface, with the mounting member 130 or 130*a* acting as a back support for the display screen, much in the manner of the support of picture frames on a horizontal surface. This is particularly convenient with the structure of FIGS. 17 and 18.

With this arrangement, the device is extremely portable and can be moved to any work station, with the display screen supported from a panel of the work station.

It will also be appreciate that any of the securing arms can be adapted for securement from the rail element, including securement of the vertical rod on which the securing arm is vertically adjustable. These securing arms can also act as a support member for the screen when released from the office panel and the screen is supported on a work surface.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A work station comprising:
    an office panel of a generally narrow depth having a horizontal work surface associated therewith,
    a flat, thin profile electronic display screen, and
    an adjustable securing arm having a free end and a mounting end; said office panel including a structural frame and associated releasable decorative and functional elements supported thereby; said panel including vertically spaced horizontally extending rail members intermediate the height of said structural frame;

said flat electronic display screen being pivotally mounted at said free end of said adjustable securing arm with said mounting end of said securing arm being releasably supported by at least one of said vertically spaced horizontally extending rail members at a position above said work surface, said adjustable securing arm adjacent said panel having a vertical hinge axis to accommodate pivotting movement of said securing arm there about;

said adjustable securing arm adjacent said flat electronic display screen including a hinge arrangement having a vertical hinge axis with said flat electronic display screen pivotally movable about said hinge axis, said flat electronic display screen being movable from a storage position immediately adjacent said office panel to an in use position in front of and spaced from said panel by said securing arm, said securing arm in said storage position being generally parallel with the front of said office panel, with said securing arm being at an angle to the front of said office panel when said flat electronic display screen is in an in use position, said in use position being variable by pivotting of said securing arm about said hinge axis adjacent said panel.

2. A work station as claimed in claim 1 wherein said securing arm is releasably supported by two rail members by means of an intermediary vertical member which is secured to each rail and extends therebetween.

3. A work station as claimed in claim 2 wherein said intermediary vertical member is a circular rod which forms part of the hinge connection of said securing arm adjacent the panel.

4. A work station as claimed in claim 3 wherein said horizontal rail members are exposed between elements of said panel.

5. A work station as claimed in claim 3 wherein said securing arm has a spring latch movable by overcoming the spring force from a locked position engaging said rod and locking said securing arm on said taxi to a release position where said securing arm is freely movable along said rod.

6. A work station as claimed in claim 1 wherein said display screen is vertically adjustable over the height of one of said elements.

7. A work station as claimed in claim 6 wherein said electronic display screen includes a rear support structure for supporting said electronic screen, said securing arm in a first support configuration releasably engaging said rear support structure to thereby secure said electronic display screen to said securing arm, said rear support member in a second support configuration cooperating with said electronic display screen to accommodate several angled support positions of said display screen on a flat surface.

8. A work station as claimed in claim 6 wherein said horizontal rails are part of a releasable element of said panel.

9. A work station as claimed in claim 8 said rear support structure releasably engages said horizontal rails of said releasable element of said panel.

10. A work station comprising:

an office panel of a generally narrow depth having a horizontal work surface associated therewith to one side of said panel, a flat, thin profile electronic display screen, and an adjustable securing arm; said office panel including a structural frame and associated releasable decorative and functional elements supported thereby; said panel including vertically spaced horizontally extending rail members;

said flat electronic display screen in a first support configuration being pivotally mounted at one end of said adjustable securing arm with an opposite end of said securing arm being releasably secured to said vertically spaced horizontally extending rail members in a cantilevered manner at a position above said work surface, said adjustable securing arm adjacent said flat electronic display screen including a hinge arrangement which accommodates pivotting of said flat electronic display screen about a generally horizontal hinge axis, and wherein said flat electronic display screen in a second support configuration is independently supported on said work surface in a plurality of different angled positions.

11. A work station as claimed in claim 10 wherein said flat electronic screen has attached to the rear surface thereof a mounting member and said mounting member acts as an intermediate securing said display screen to said securing arm.

12. A work station as claimed in claim 11 wherein said mounting member has a hinge connection with said screen which forms said hinge arrangement which accommodates pivotting of said flat electronic display screen about said horizontal hinge axis.

* * * * *